United States Patent Office 3,746,689
Patented July 17, 1973

3,746,689
POLYISOCYANATES BLOCKED WITH POLYHALOALCOHOLS
T. V. Lakshmi Narayan, Riverview, and Moses Cenker, Trenton, Mich., assignors to BASF Wyandotte Corporation, Wyandotte, Mich.
No Drawing. Filed Feb. 11, 1972, Ser. No. 225,589
Int. Cl. C07c 125/06; C08g 22/32
U.S. Cl. 260—77.5 TB       11 Claims

ABSTRACT OF THE DISCLOSURE

Blocked isocyanates are prepared by reacting an organic isocyanate with a haloalkanol of 1 to 6 carbon atoms in the presence of a basic catalyst and at ambient or an elevated temperature. Subsequent unblocking of the isocyanate in the presence of and without damage to the polyol reactant is obtained by heating, typically at about 100° to about 180° C. Comparable after cure physical properties are obtained on polyurethanes prepared with a blocked isocyanate or its nonblocked counterpart.

BACKGROUND (1) Field of the invention

This invention relates to the preparation and use of blocked isocyanates in polyurethane polymers.

(2) Description of the prior art

Blocked isocyanates are adducts of isocyanate which are inert toward active hydrogen-containing components at low temperatures but which when heated to elevated tempeartures become reactive.

Blocked isocyanates are well known in the prior art as intermediates in many fields or polyurethane applications. The blocked isocyanates are used in order to avoid the reduced pot life or working time and moisture instability of two-component polyurethane systems. A two-component system is comprised of an isocyanate-terminated intermediate polymer component and a component-containing active hydrogen atoms such as additional diols, triols and other cross-linking polymers and blowing agents, e.g. water. The intermediate isocyanate component is very susceptible to moisture in the air causing premature chain extension and foaming.

Phenol has been the most commonly described blocking agent. Although phenol-blocked isocyanate systems are satisfactory, they form toxic by-products during deblocking reactions. Compounds such as ethylacetoacetate, ethylmalonate, imides and amides are also frequently used as blocking agents. Normally, preparation of isocyanate adducts with these materials demands time-consuming, complicated methods. Sometimes one finds it impossible to completely block isocyanate groups with such materials as imides or amides due to low reactivity of amides or imides with isocyanates. Although simple alcohols readily block the isocyanate group, the high temperatures required for releasing the isocyanate group from its blocked condition results in degradation of the final product.

The volatility of the blocking agent is another important factor in selecting a blocking agent. During the thermal activation of the blocked isocyanate, significant amounts of free isocyanate and free blocking agent are formed and care must be taken to avoid upsetting the delicate equilibrium and reversing the reaction. If the blocking agent is not highly volatile and remains in proximity of the regenerated isocyanate groups, it would compete with the material containing active hydrogen, e.g. polyol, for the free isocyanate groups.

SUMMARY OF THE INVENTION

In accordance with this invention there is provided completely blocked organo isocyanates wherein the blocking agent is a halogenated alkanol containing from 1 to 6 carbon atoms and the halogen has a maximum atomic number of 17. The completely blocked organic isocyanates are prepared by reacting under basic catalysis and at ambient or elevated temperature an organic isocyanate with a halogenated alkanol dissolved in an organic solvent and recovering the resulting blocked isocyanate. Thereafter, the blocked isocyanate is used in the intended application by simply heating at an elevated temperature with the other reactants.

DESCRIPTION OF THE PREFERRED EMBODIMENT

Representative of the typical organic polyisocyanates which may be used in preparing the blocked isocyanate terminated intermediates of this invention are isocyanate compounds having one or more NCO groups and a molecular weight of about 100 to about 700 such as m-phenylene diisocyanate, toluene-2,4-diisocyanate, toluene-2,6-diisocyanate, mixtures of the 2,4- and 2,6-isomers of toluene diisocyanate such as 80:20 and 65:35 ratios of 2,4- and 2,6- respectively, hexamethylene-1,6-diisocyanate, tetramethylene - 1,4 - diisocyanate, cyclohexane-1,4-diisocyanate, naphthlene - 1.5 - diisocyanate, 1-methoxyphenyl - 2,4 - diisocyanate, diphenylmethane - 4,4'-diisocyanate, p-xylene-diisocyanate, butylene-1,4-diisocyanate, 3,3' - dimethyl - 4,4' - biphenylene diisocyanates; triisocyanates such as triphenylmethane-4,4',4'-triisocyanate, diphenylmethane-2,4,4' - triisocyanate; tetraisocyanate such as 4,4'-dimethyldiphenylmethane 2,2', 5,5' tetraisocyanate and mixtures of polyisocyanates. Additionally, it is within the contemplation of this invention to use crude isocyanates such as crude toluene diisocyanate and crude methylene diphenyl diisocyanate.

In addition to the foregoing description of monomeric isocyanates, this invention is also applicable to polymeric types of isocyanates generally referred to as prepolymers wherein a poly(di- or higher) isocyanate is reacted with a polyol, a polyamine or a mixed hydroxyl amine so that the resulting prepolymer contains unreacted isocyanate groups. Suitable polyols include but are not limited to monomeric polyols such as diols, e.g. 1,4-butanediol, ethyylene glycol; triols, e.g. trimethylol propane; polymeric polyols of both the polyether and polyester type, e.g., the condensation product of an alkylene oxide with poly-primary or secondary amines or an alkylene oxide with a polyhydric alcohol or the reaction product of a polycarboxylic acid with polyhydric alcohol; and polyester amides obtained by including some amine or aminoalcohol in the reactants for the preparation of the polyester. Polyamines which are useful in preparation of polyester amides include aromatic amines, e.g. p-amino aniline, 1,5-diamino naphthalene and the like; and aliphatic polyamines, e.g. ethylene diamine, 1,3-propylene diamine, 1,3-butylene diamine and the like.

The halogenated alkanols employed in this invention are linear or branched monohydric halogenated alkanols containing from 1 to 6 carbon atoms. Thus, included within the scope of this invention are the primary, secondary or tertiary alkanols. Any of the halogens having atomic number of 17 or less is satisfactory and the alkanol can be partially or completely halogenated as well as halogenated with one or a mixture of halogens. Illustrative of the halogenated alkanols of this invention are 2-chloroethanol, 1,1 - dichloro - 2 - methyl-2-propanol, 1,1,1-trichloro-2-propanol, 2,2,2 - trichloroethanol, 2,2,2 - trifluoroethanol, 1,1,1,3,3,3 - hexafluoro-2-propanol, perfluoro-t-butanol, and 1,1,1 - trichloro-2-methyl-2-propanol.

It is highly desirable but not necessary to carry out the reaction in an inert or unreactive solvent particularly an aromatic solvent such as benzene, xylene or toluene in which the blocked isocyanate product is insoluble and will precipitate out as formed thereby allowing recovery of the product by simple filtration.

The reaction is carried out under basic catalysis which is readily obtainable by the addition of small catalytic amounts, that is, up to about 5% by weight are preferable, of amines or nitrogen heterocyclic compounds or a metallo-organic salt to the reaction medium. Among the satisfactory amines are tertiary alkylamines exemplified by triethylenediamine, trimethylamine, tetramethylene diamine, triethylamine, N,N-dimethyl aniline, N,N-dimethylbenzylamine, and tri-n-propylamine. The nitrogen heterocyclic compounds are exemplified by pyridine and N-methyl morpholine. The metallo-organic salt catalyst is a polyvalent metal salt of an organic acid having up to about 18 carbon atoms and being void of active hydrogen atoms. The organo portion of the salt may be either linear or cyclic and saturated or unsaturated. The polyvalent metal has a valence from about 2 to 4. Typical metallo-organic salts include stannous acetate, stannous butyrate, stannous 2-ethylhexanoate, stannous laurate, stannous oleate, stannous stearate, lead cyclopentane carboxylate, cadmium cyclohexene carboxylate, lead naphthenate, cobalt naphthenate, zinc naphthenate, cadmium naphthenate, dibutyltin dilaurate, dibutyltin di-2-ethylhexanoate, mercury propionate, bismuth oleate and the like.

The blocked isocyanates of this invention are prepared by reacting a slight stoichiometric excess of the haloalkanol with the isocyanate in the presence of the basic catalyst. Catalyst is added to the liquid reaction medium, then the haloalkanol is charged and finally with agitation as required, the isocynate is added slowly and the reaction is continued until the blocked isocyanate has precipitated out of the reaction medium. Preferably the reaction is carried out at slightly elevated temperatures, that is, temperature above room temperature but below the temperature at which the reaction is reversed and the isocyanate is released, and preferably this temperature will be from about 40° to about 120° C. The reaction is carried out at substantially atmospheric pressure and is well suited to be carried out under reflux conditions so as to avoid loss of the reaction media. The precipitated blocked isocyanate is recovered by conventional filtering techniques and after drying is then ready for use.

The blocked isocyanates of this invention are useful in preparing the various polyurethane, polyurea or polyurethane/polyurea compositions well known in the art. At the risk of pointing out the readily understood, it should be pointed out that mono-isocyanates prepared according to this invention are useful for modification as opposed to preparation of the foregoing polymeric compositions. Additionally, special polymers are obtained by the use of monomers capable of linking by two different mechanisms. Thus, polymeric compositions are readily prepared by adding appropriate molar quantities of the blocked isocyanate to a polyester polyol, a polyether polyol, a polyamine or mixtures of two of more of the foregoing reactants with sufficient heat to cause the reaction of the blocked isocyanate and volatilization of the haloalkanol. Typically the activation temperature will be from about 75° to about 200° C. More preferably the activation of the isocyanate will be obtained at a temperature from about 100° to about 180° C. depending on the reactants used in preparing the blocked isocyanate and the polymeric composition being prepared, polyurethane vis-a-vis urethane/urea polymer. The blocking agents of this invention, because of the highly electron withdrawing halogen atoms, have excellent unblocking ability. The blocking agents are low boiling and highly volatile. Because of the combined balance of properties of the blocking agents, thick sections of urethane resins can be prepared devoid of entrapped bubbles.

The practice of this invention is illustrated by but not limited by the examples given below. Unless otherwise noted, temperature is expressed in degrees centigrade and parts are parts by weight.

EXAMPLE I

To a 2-liter reaction vessel equipped with a thermometer, addition funnel, reflux condenser and a mechanical stirrer was charged 175.0 g. of 1,1,1,3,3,3-hexafluoro-2-propanol, 3.5 g. of triethylamine and 1000 ml. of toluene. To this mixture 87.0 g. of liquid toluene diisocyanate (80% 2,4-isomer, 20% 2,6-isomer) (hereinafter referred to as TDI) was added dropwise. Addition took 2.5 hours during which time the temperature of the reaction mixture rose to 52° C. During the addition of TDI, a crystalline white solid commenced to precipitate. After the addition has been completed, the reaction mixture was heated at reflux temperature for 2.5 hours. The reaction mixture was then allowed to cool to room temperature and the solid precipitated was collected by filtration and dried in a vacuum desiccator. The yield of the hexafluoroisopropanol blocked TDI was 234.0 g. representing a conversion of 92%, M.P. 172–76° C. Examination of the infrared spectrum confirms the structure of the product. The infrared absorption due to the isocyanate group (wave length 4.4μ) has completely disappeared and new strong absorptions at 3μ and 5.7μ prove the formation of the desired completely blocked isocyanate. A small sample of the product was titrated with di-n-butylamine which indicated that no unreacted isocyanate was present in the resulting adduct. A test was performed to obtain the minimum temperature at which a significant amount of reaction occurred between the blocked isocyanate and water. A sample of the said product in a solvent such as methoxypropylene glycol with a small amount of water was heated and the gases evolved were passed through saturated barium hydroxide solution. The temperature at which precipitation occurred was noted as minimum deblocking temperature. Hexafluoropropanol blocked toluene diisocyanate had a minimum deblocking temperature of 94° C.

EXAMPLE II

A portion (91.8 g.) of blocked isocyanate from Example I and 92.5 g. of polyoxypropylene glycol of molecular weight 1000 were charged into a 500 ml. reaction vessel equipped with a thermometer, mechanical stirrer and heated at 150° C. for 0.5 hour. A clear yellow liquid product was obtained.

The product (50 g.) was again heated to 150° C. in a metal container equipped with a thermometer with occasional agitation. Six grams of molten methylene-bis(o-chloroaniline) was added, the mixture well agitated and cast into a preheated steel mold (110° C.). After curing for 1 hour at 110° C., a tough, clear elastomeric poly(urethane-urea) section was obtained.

EXAMPLE III

To a 500 ml. 4-neck flask equipped with a reflux condenser, thermometer, addition funnel and mechanical stirrer was charged 84.0 g. (0.5 mole) of hexafluoroisopropanol, 200 ml. of toluene and 2.5 g. of triethylamine. To this mixture was added dropwise 59.5 g. of phenylisocyanate. After the addition of the isocyanate has been completed, the reaction mixture was heated at reflux for 2 hours. Upon cooling to room temperature, white crystalline solid separated, which was collected by filtration and dried to yield 130 g. (91%) of hexafluoroisopropylcarbanilate (M.P. 101–102° C.).

EXAMPLE IV

Five hundred grams of an isocyanate terminated prepolymer (available isocyanate 5.52%) derived from reaction of TDI with a blend of polyoxypropylene glycols and 2.5 g. of triethylamine was charged into a reaction vessel equipped with a reflux condenser and high torque mechanical stirrer. A slight theoretical excess of 1,1,1,3,3,3-hexafluoroisopropanol (theory requires 110.5 g.) was added dropwise and the exotherm (60° C.) was allowed to develop. After the addition has been completed, the mixture was gradually heated to 100° C. and maintained at that temperature for 2 hours. After allowing the contents to cool to room temperature, the catalyst and the excess of the blocking agent were removed by stripping under reduced pressure. The blocked prepolymer was a clear fluid liquid and examination of the infrared spectrum indicated the completion of the blocking reaction. Titration of the blocked prepolymer with dibutylamine indicated that all the available isocyanate had been blocked.

EXAMPLE V

Seventy-five grams of the blocked prepolymer from Example IV was heated to 150° C. and degassed. Twenty-five milligrams of triethylene diamine was added, followed by 13.1 g. of molten methylene-bis(o-chloroaniline) and the mixture cast into a preheated mold. It was cured at 80° C. for 24 hours to give a tough, elastomeric poly(urethane-urea) product.

EXAMPLE VI

A polyurethane product was obtained by mixing 12.8 g. of the blocked TDI from Example I with 100.2 parts of polyoxypropylene glycol having a molecular weight of 2000, heating the mixture to 145° C., casting in a preheated mold and curing at 110° C. for 30 hours.

EXAMPLE VII

Five hundred grams of an isocyanate terminated prepolymer (available isocyanate 4.05%) derived from reaction of TDI with a blend of polyoxypropylene glycols, polyoxypropylene triol based on trimethylol propane having a molecular weight of 1500, 1,4-butanediol, 2.5 g. of triethylamine, and 89.0 g. of hexafluoroisopropanol were charged into a reaction vessel equipped with a high torque mechanical stirrer and a reflux condenser. The mixture was stirred and, after the exotherm subsided, it was heated at 100° C. for 3 hours. At the end of the reaction period, infrared spectrum and titration with dibutylamine indicated the complete blocking of the isocyanate terminated prepolymer.

EXAMPLE VIII (Comparative Example)

Test specimen 1 (prior art)

Seventy-two parts of the isocyanate terminated prepolymer derived from a blend of a polyovypropylene triol based on trimethylol propane having a molecular weight of 1500, polyoxypropylene glycols having molecular weights of 1300 and 2000, and 1,4-butanediol, reacted with TDI was heated to 70° C. and degassed. Molten methylene bis (o-chloroaniline) (8.4 g.) was then added, mixed and cast into a preheated mold. It was cured at 110° C. for 2 hours, demolded and post-cured for 12 hours.

Test specimen 2 (this invention)

Eighty-two parts of blocked prepolymer from Example VI was heated to 150° C., degassed, and molten methylene bis(o-chloroaniline) was added. After mixing, it was cast into a preheated mold, cured at 110° C. for 3 hours, demolded, and post-cured for 18 hours at 110° C.

The mechanical properties of the Test Specimens 1 and 2 are listed in Table I.

TABLE I

| Sample | Specimen 1 | Specimen 2 |
|---|---|---|
| Tensile strength, p.s.i | 3,700 | 2,960 |
| 300% modulus, p.s.i | 1,760 | 1,200 |
| 100% modulus, p.s.i | 900 | 660 |
| Elongation, percent | 440 | 565 |
| Graves tear, p.i | 283 | 256 |
| Shore A hardness (Inst.—5 sec.) | 86–82 | 83–77 |

EXAMPLE IX

In a reaction flask equipped with a reflux condenser, thermometer, addition funnel and mechanical stirrer was placed 1050 g. of polyoxypropylene glycol of molecular weight 1000, and 348 g. of TDI was added dropwise during a period of 1 hour. After the addition has been completed, the contents of the flask were heated to 80° C. and maintained at this temperature for 2 hours. Titration with dibutylamine indicated that the available isocyanate was 6.22% (6.12% theory). At this stage 376.4 g. of hexafluoroisopropanol was added portionwise and the mixture heated for 2 hours at 80° C. The resultant clear viscous solution was titrated with dibutylamine and found to contain no available isocyanate.

EXAMPLE X

Seventy grams of the product from Example IX was heated to 100° C., degassed, and 11.3 g. of molten methylene bis (o-chloroaniline) was added. It was then cast into a preheated mold and cured at 120° C. to yield a tough, elastomeric poly(urethane-urea) polymer.

EXAMPLE XI

The product from Example IX (47.6 g.) was heated to 100° C. and 5.8 g. of polyoxypropylene triol based on trimethylol propane and having a molecular weight of 300 was added, mixed well and cast into a preheated mold. It was cured at 120° C. to give a very flexible polyurethane rubber.

EXAMPLE XII

Following the procedure described in Example VIII 1102 g. of polyurethane prepolymer (available isocyanate 7.68%) prepared from a polyoxypropylene glycol and TDI was blocked with 338 g. of hexafluoroisopropanol.

EXAMPLE XIII

Fifty grams of the product from Example XII was heated to 100° C. and 10.3 g. of molten methylene bis (o-chloroaniline) was added and cast into a preheated mold. After curing at 120° C., a tough poly(urethane-urea) elastomer was obtained.

EXAMPLE XIV

In a one-liter reaction vessel equipped with a thermometer, reflux condenser, mechanical stirrer and addition funnel was placed 105.0 g. of 2,2,2-trifluoroethanol, 10.0 g. of triethylamine, and 300 ml. of toluene. One-half mole of TDI (87.0 g.) was added dropwise while the temperature reached a maximum of 63° C. After the addition was completed, the reaction mixture was allowed to cool to room temperature, the precipitate formed was collected by filtration and dried to yield (93%) trifluoroethanol blocked TDI (M.P. 140–158° C.).

EXAMPLE XV

To a charge of 11.0 g. of 2,2,2-trifluoroethanol, 0.3 g. of triethylamine and 50 ml. of toluene in a 200 ml. beaker was added dropwise, 11.9 g. of phenylisocyanate with stirring. The temperature reached a maximum of 40° C. when all the isocyanate was added. The toluene was stripped off under reduced pressure to yield 21.9 g. (100%) of white, crystalline 2,2,2-trifluorocarbanilate (M.P. 69–70° C.).

EXAMPLE XVI

In a reaction vessel equipped with a reflux condenser, mechanical stirrer, thermometer and addition funnel was placed 1000 g. of an isocyanate terminated prepolymer (available isocyanate 4%), and 2.0 g. of triethylamine, and 107 g. of trifluoroethanol. The contents of the vessel were mixed thoroughly, heated to 82° C. for 2 hours. Excess trifluoroethanol and triethylamine were removed by stripping under vacuum. Examination of the infrared spectrum of this compound indicated the completion of the blocking reaction. Titration of a sample of the product with dibutylamine showed no free isocyanate.

EXAMPLE XVII

Seventy-three grams of the product from Example XVI was gradually heated to 105° C. and degassed. Molten methylene bis(o-chloroaniline) (8.4 g.) was then added, the mixture was stirred and cast into preheated mold. After curing for 20 hours at 110° C., a tough poly(urethane-urea) elastomer was obtained.

EXAMPLE XVIII

Following the general procedure of Example XVIII, 71.0 g. of trifluoroethanol blocked isocyanate terminated prepolymer was chain extended with 6.0 g. of methylene dianiline. After curing at 110° C. for 18 hours, a tough poly(urethane-urea) elastomer was obtained.

EXAMPLE XIX

Following the general procedure as described in Example XVII, 74.0 g. of the blocked prepolymer was chain extended with 3.7 g. of hexanediamine at 100° C. After curing at 110° C. for 20 hours, a tough poly(urethane-urea) elastomer was obtained.

EXAMPLE XX

Following the general procedure of Example XVII, 62.0 g. of blocked prepolymer was chain extended with 3.9 g. of 2-methylpiperazine at 100° C. After curing at 110° C. for 20 hours, a tough poly(urethane-urea) elastomer was obtained.

EXAMPLE XXI

In a reaction flask equipped with a reflux condenser, thermometer, mechanical stirrer and addition funnel was placed 21.9 g. (0.15 mole) of 2,2,2-trichloroethanol, 1.0 g. of triethylamine and 100 ml. of toluene. While the mixture was being stirred, 12.7 g. (0.07 mole) of TDI was added dropwise. After the addition was completed, the reaction contents were heated at 100° C. for 2.5 hours. It was then allowed to cool to room temperature, the precipitated 2,2,2-trichloroethanol blocked TDI was collected by filtration and dried to yield 27 g. (78%) of product (M.P. 130–34° C.).

EXAMPLE XXII

To a reaction flask equipped with a reflux condenser, thermometer, addition funnel and mechanical stirrer was charged, 23.8 g. (0.2 mole) of phenylisocyanate, 150 ml. of toluene, and 2.0 g. of triethylamine. A solution of 36.0 g. (0.22 mole) of 1,1,1-trichloroisopropanol in 150 ml. of toluene was added dropwise and the mixture heated at 50–60° C. for 1 hour. Upon cooling to room temperature, 1,1,1-trichloroisopropyl carbanilate precipitated. It was collected by filtration and dried to yield 56.0 g. (100%) of product.

EXAMPLE XXIII

A solution of 163.5 g. 1,1,1-trichloroisopropanol in 250 ml. of toluene was prepared in a reaction flask equipped with a reflux condenser, addition funnel. Catalytic amounts of triethylamine (2.5 g.) were added to this solution, while it was being stirred 87.8 g. of TDI was added dropwise. After the addition was completed, the reaction mixture was heated at reflux for 2 hours. Upon cooling to room temperature crystalline trichloroisopropanol blocked TDI precipitated. It was collected by filtration and dried to yield 225 g. (90%) of product (M.P. 132–36° C.).

EXAMPLE XXIV

A mixture of 300.0 g. of an isocyanate-terminated polyurethane prepolymer (available isocyanate 5.52%), derived from reaction of TDI with a blend of polyoxypropylene glycol, 71.0 g. of trichloroisopropanol, and 0.5 g. of stannous octoate was heated for 2 hours at 60° C. After this heating period, a sample of the mixture was titrated with dibutylamine to show the absence of free isocyanate.

EXAMPLE XXV

In a reaction flask equipped with a reflux condenser, thermometer, addition funnel was placed 32.2 g. (0.4 mole) of 2-chloroethanol, 100 ml. of toluene and 1.7 g. of pyridine. While this mixture was being stirred, 34.8 g. (0.2 mole) of TDI was added dropwise. After the addition was completed, it was heated at reflux for 5 hours, allowed to cool to room temperature, and toluene stripped under reduced pressure, washed with petroleum ether, and dried to yield 63.0 g. (90%) of chloroethanol blocked TDI.

EXAMPLE XXVI

To a reaction vessel equipped as described in Example XXV was charged 32.2 g. (0.4 mole) of 2-chloroethanol, 20 ml. of toluene, and 2.5 g. of pyridine. A solution of 50.0 g. (0.2 mole) of (4,4-diphenylmethanediisocyanate) in 80 ml. of toluene was added dropwise. After the addition was completed, the contents were allowed to reflux for 2 hours upon cooling to room temperature, while crystalline chloroethanol blocked MDI precipitated. It was collected by filtration, washed with petroleum ether and dried to yield 80.0 g. (97%) of product.

EXAMPLE XXVII

In a 250 ml. reaction vessel equipped as described in Example XXV was placed a solution of 23.9 g. of (0.22 mole) isobutylene chlorohydrin in 100 ml. of toluene and 1.0 g. of lead naphthenate. With stirring, 17.4 g. (0.1 mole) of TDI was added dropwise. After the addition was completed, it was heated at reflux for 4 hours. The reaction mixture was allowed to cool to room temperature, treated with petroleum ether. The precipitate formed was collected by filtration and dried to yield 28.0 g. (68%) of isobutylene-chlorohydrin-blocked TDI.

EXAMPLE XXVIII

To 500 ml. reaction vessel equipped as described in Example XXV was charged 35.2 g. of hexafluoroisopropanol, 150 ml. of benzene and 0.5 g. of dibutyltin dilaurate. Stirring was commenced and a solution of 25.0 g. of 4,4-diphenylmethanediisocyanate (hereinafter referred to as MDI) in 100 ml. of benzene was added dropwise. After the addition was completed, the reaction mixture was heated at reflux for 1 hour. Upon cooling to room temperature, crystalline hexafluoroisopropanol-blocked MDI precipitated, collected by filtration and dried to yield 48.6 g. (83%) of the product.

EXAMPLE XXIX

In a reaction vessel equipped as described in Example XXV was placed 21.0 g. of 2,2,2-trifluoroethanol, 100 ml. of benzene, and 1.0 g. of N-ethylmorpholine. Stirring was commenced and a solution of 25.0 g. of crude MDI (typical available isocyanate content 31.5%) in 25 ml. of benzene was added dropwise. After the addition was completed, the mixture was heated at reflux for 4 hours. Upon cooling to room temperature, light brown crystalline material precipitated, collected by filtration and dried to yield 41.9 g. (95%) of trifluoroethanol-blocked crude MDI.

EXAMPLE XXX

To a 500 ml. reaction vessel equipped with a reflux condenser, addition funnel, thermometer, and mechanical stirrer was charged 20.0 g. of 2,2,2-trifluoroethanol and 50 ml. of xylene. While the mixture was stirred, a solution of 14.0 g. of phenylenediisocyanate in 200 ml. of xylene was added dropwise. After the addition was completed, the reaction contents were stirred for another hour, and the precipitated solid was collected by filtration and dried. The yield of 2,2,2-trifluoroethanol-blocked phenylenediisocyanate was 27 g. (86%), M.P. 135–36° C.

The foregoing examples have been described in the above specification for the purpose of illustration and not limitation. Many other modifications and ramifications based on this disclosure will naturally suggest themselves to those skilled in the art. These are intended to be comprehended as within the scope of this invention.

The embodiments of the invention in which an exclusive property or privilege is claimed are defined as follows:

1. A completely blocked organic isocyanate wherein the blocking agent is a halogenated alkanol selected from the group consisting of 1,1,1,3,3,3-hexafluoro-2-propanol, 2,2,2-trichloroethanol, 2,2,2-trifluoroethanol and 1,1,1-trichloro-2-propanol.

2. The isocyanate of claim 1 wherein the blocking agent is 1,1,1,3,3,3-hexafluoro-2-propanol.

3. The isocyanate of claim 1 wherein the blocking agent is 2,2,2-trichloroethanol.

4. The isocyanate of claim 1 wherein the blocking agent is 2,2,2-trifluoroethanol.

5. The isocyanate of claim 1 wherein the blocking agent is 1,1,1-trichloro-2-propanol.

6. The blocked isocyanate of claim 1 wherein the isocyanate is a polyol/polyisocyanate prepolymer.

7. The blocked isocyanate of claim 1 wherein there is a plurality of blocked isocyanate groups.

8. A polyurethane, polyurea of polyurethane/polyurea uncured polymeric composition wherein the isocyanate reactant used to prepare the polymeric composition was a blocked isocyanate of claim 7.

9. The polymeric composition according to claim 8, wherein the composition is a polyurethane composition.

10. The composition according to claim 8 wherein the polymeric composition is a mixed polyurethane/polyurea composition.

11. The composition according to claim 8 wherein the polymeric composition is a polyurea composition.

References Cited

UNITED STATES PATENTS

| | | |
|---|---|---|
| 2,959,611 | 11/1960 | Nelson et al. |
| 3,061,557 | 10/1962 | Hostettler et al. _____ 260—2.5 |

FOREIGN PATENTS

| | | |
|---|---|---|
| 891,567 | 3/1962 | Great Britain |
| 1,032,059 | 6/1966 | Great Britain ____ 260—77.5 UX |

OTHER REFERENCES

Hudson et al., Official Digest, 32, 213–221 (1960).

Vieweg/Hoechtlen — Polyurethane (Kunststoff Handbuch VII Baud/Hanser, Munich, 1966, pp. 8–14.

DONALD E. CZAJA, Primary Examiner

H. S. COCKERAM, Assistant Examiner

U.S. Cl. X.R.

260—482 B